Figure 1:
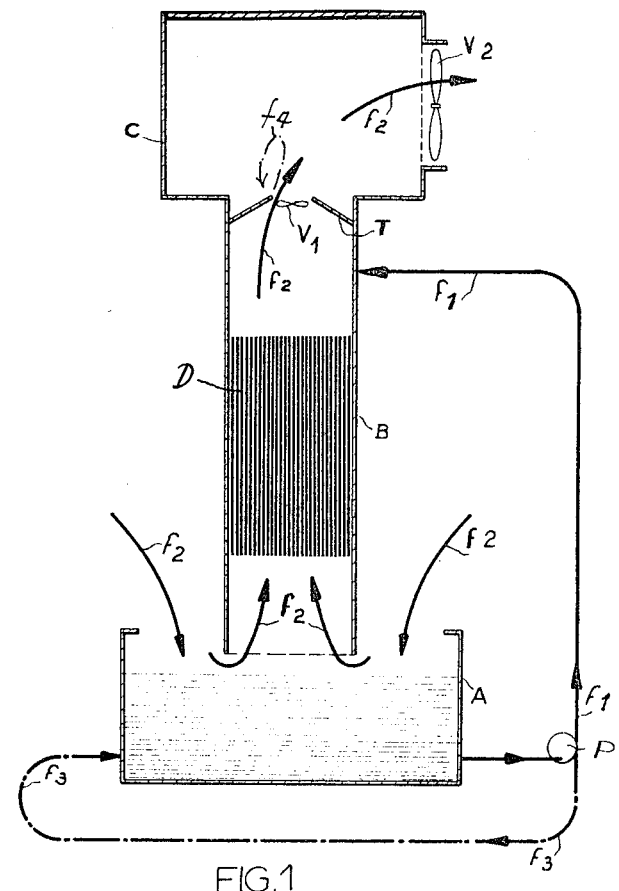

Oct. 25, 1966    P. CHARUIT ETAL    3,280,887
PROCESS AND APPARATUS FOR THE CONCENTRATION
OF RADIOACTIVE SOLUTIONS OR LIQUIDS
Filed April 1, 1963    2 Sheets-Sheet 1

INVENTORS
PIERRE CHARUIT
GÉRALD WORMSER

BY Bacon & Thomas

ATTORNEYS

Oct. 25, 1966                P. CHARUIT ETAL                3,280,887
              PROCESS AND APPARATUS FOR THE CONCENTRATION
                    OF RADIOACTIVE SOLUTIONS OR LIQUIDS
Filed April 1, 1963                                    2 Sheets-Sheet 2

INVENTORS
PIERRE CHARUIT
GÉRALD WORMSER

BY  Bacon & Thomas

ATTORNEYS 3,280,887
PROCESS AND APPARATUS FOR THE CONCENTRATION OF RADIOACTIVE SOLUTIONS OR LIQUIDS
Pierre Charuit, Montpellier, and Gérald Wormser, Meylan, France, assignors to Commissariat a l'Energie Atomique, Paris, France
Filed Apr. 1, 1963, Ser. No. 269,262
Claims priority, application France, Apr. 4, 1962, 893,653
4 Claims. (Cl. 159—13)

The present invention relates to a process for the concentration of dangerous solutions or liquids by natural evaporation and to apparatus for the practical application of said process, while said liquids or solutions can, for example be constituted by radioactive effluents.

When the by-products of certain chemical treatment or manufacturing processes are liquids or solutions of salts which are more or less dilute and which, even in a small dose, are potentially dangerous to man and to living organisms in general—for example radioactive salts—the disposal of such waste products creates complex problems. It is not always possible, in fact, to dispose of these liquids or these solutions by conventional means such as chemical reaction processes which neutralize their toxic effects by formation of other salts which are non-toxic, or simply by discharging them into rivers and other watercourses, or into the sea and even into the atmosphere.

The usual method in such cases consists either in concentrating liquid wastes in such manner as to reduce their volume to the minimum, or even to crystallize these latter with a view to subsequently storing the product obtained in a hermetically sealed container which is kept in an inaccessible location. It is known that the concentration process referred to above can be carried out by conventional prior art means, that is to say: either by artifical evaporation (thermocompression, multiple-effect evaporation under partial vacuum, etc.), or by natural evaporation (open-air stagnant-liquid basins).

All these processes are subject to various disadvantages which are more or less serious.

In particular, the solvent which evaporates always entrains with it a few particles of solution which subsequently find their way to the condenser (artifical evaporation) or to the atmosphere (natural evaporation). In the case of radioactive solution—when these latter are treated by natural evaporation—there then arises a danger of contamination through local flora and fauna.

Moreover, the solution can contain substances (e.g. nitrates, etc.) which are liable to cause explosions during evaporation, especially in an oxidizing medium under the influence of temperature.

The process and apparatus in accordance with the present invention are precisley intended to permit the concentration of dangerous solutions or liquids by means of of a forced-draught natural evaporation process (consequently which consumes the minimum power), said process being carried out in such manner that the air which passes out of the apparatus and which is discharged into the atmosphere does not contain in a dangerous concentration any of the products which were dissolved in the initial solution to be concentrated, this being achieved by virtue of the fact that the dangerous particles are fixed in a predetermined part of the apparatus—thereby making it possible to proceed subsequently to the complete elimination of said particles—whereas the contamination of the outer air as a result of the entrainment of said particles in the course of the evaporation process is thereby avoided. In this process, the decontaminated solvent is discharged into the atmosphere in the state of air which which is non-saturated with moisture, which accordingly prevents any danger of precipitation by condensation and thus achieves satisfactory conditions of safety.

The process based on the principle of natural evaporation in accordance with the invention is particularly advantageous for the treatment of radioactive effluents in nuclear power plants in which local watercourses afford inadequate possibilities of dilution.

Furthermore, the process in accordance with the invention makes it possible to obtain a solution having a high concentration and in certain cases to obtain crystallized salts.

In its general principle, the present invention is characterized by the combination of the following means:

(a) The solution to be concentrated circulates in counterflow to an air stream inside a chamber in which it is made necessary for said solution to be subdivided to a maximum extent by any suitable means, the evaporation surface thereof being thus substantially increased.

(b) At the outlet of said dividing chamber, the airstream filaments pass through a throttling cone frustrum which increases the velocity thereof, then penetrate inside a chamber having a cross-sectional area which is larger than that of the dividing chamber and expand therein, finally passing out of this expansion chamber through an opening having a cross-sectional area at least equal to that of the opening through which said airstream filaments are admitted in said expansion chamber.

As a result of a suitable choice of the temperature of the solution, as a result also of a judicious setting of the air flow rates, and even as a result of the possible presence of deflectors and/or baffles in the expansion chamber, there does not take place any entrainment of droplets of the solution to be concentrated and there is no danger of pollution of the ambient air, in view of the fact that the air is discharged from the apparatus at a temperature which is lower than the ambient air and is non-saturated with moisture.

It should be noted that the velocity of circulation of air over the solution will be regulated to a value which will depend on the inherent nature of said solution and on the other processing conditions.

As will be understood, it will be feasible to vary the means employed for the practical application of the process while nevertheless remaining within the scope of the invention.

For example, in an integrated apparatus which will be described below, the air stream is generated by the suction or delivery of a fan. Various means can be employed for the purpose of carrying out the function of the dividing chamber.

For example, and not in any limitative sense, the solution can run down vertically over the external portion of a series of horizontal tubes which are placed one beneath the other and in the interior of which there can be made to circulate a liquid for the purpose of increasing the temperature of the solution to be concentrated. It is also possible to cause the solution to run over vertical plates which are placed parallel to each other and which promote the formation of a very thin liquid film.

There now follows below a description which is given by way of example and which relates to an apparatus in accordance with the invention, said apparatus being designed for the concentration of radioactive solutions.

In FIG. 1, which is a diagrammatic vertical view of the apparatus and which serves to give a clear understanding of its working principle: A designates a vessel which contains the liquid to be concentrated, B designates the dividing chamber and C designates the expansion chamber. Between these two chambers is mounted a cone frustum T, and slightly below the top opening formed by this latter, a vertical-axis fan $V_1$.

A second fan $V_2$ having a horizontal axis is mounted at the outlet of the expansion chamber.

A pump P effects the circulation of the liquid along the path $f_1$, whereas the action of the fans generates a circulation of air in the direction of the arrows $f_2$.

The operation of the apparatus is as follows:

The pump P sucks from the vessel A the liquid to be concentrated and delivers said liquid in the direction $f_1$ to the top of the chamber B in the interior of which said liquid runs down under the action of gravity over suitably designed dividing elements D, then finally causes the liquid to return to the vessel.

As regards the air which is sucked in by the fans inside the bottom opening of the chamber B, the air flows upwards inside this latter (as shown by the arrows $f_2$) in counterflow to the liquid, flows through the fan $V_1$, then through the throttled opening of the cone frustum T, expands in the interior of the chamber C and finally passes into the atmosphere through the fan $V_2$.

The part played by the expansion chamber is very important; the throttling cone produces, prior to the admission of air inside said chamber a slight compression of the air as well as an increase in velocity of the airstream filaments. There accordingly takes place by this means a recombining of the droplets of liquids into larger droplets. Inside the expansion chamber which follows, there takes place on the contrary an expansion and a deceleration of the airstream filaments, thereby permitting said droplets to fall back and thus return to the chamber B through the throttling cone T, as indicated at $f_4$. Provision can if necessary be made for a second liquid circuit $f_3$ which is mounted as a by-pass on the delivery pipe of the pump so as to produce inside the vessel A a powerful agitation of the liquid and thus to maintain in suspension all the particles contained in said liquid. This will be the case especially if it is desired to recover the concentrates in the dividing chamber by fixation on the internal elements thereof.

Figure 2:
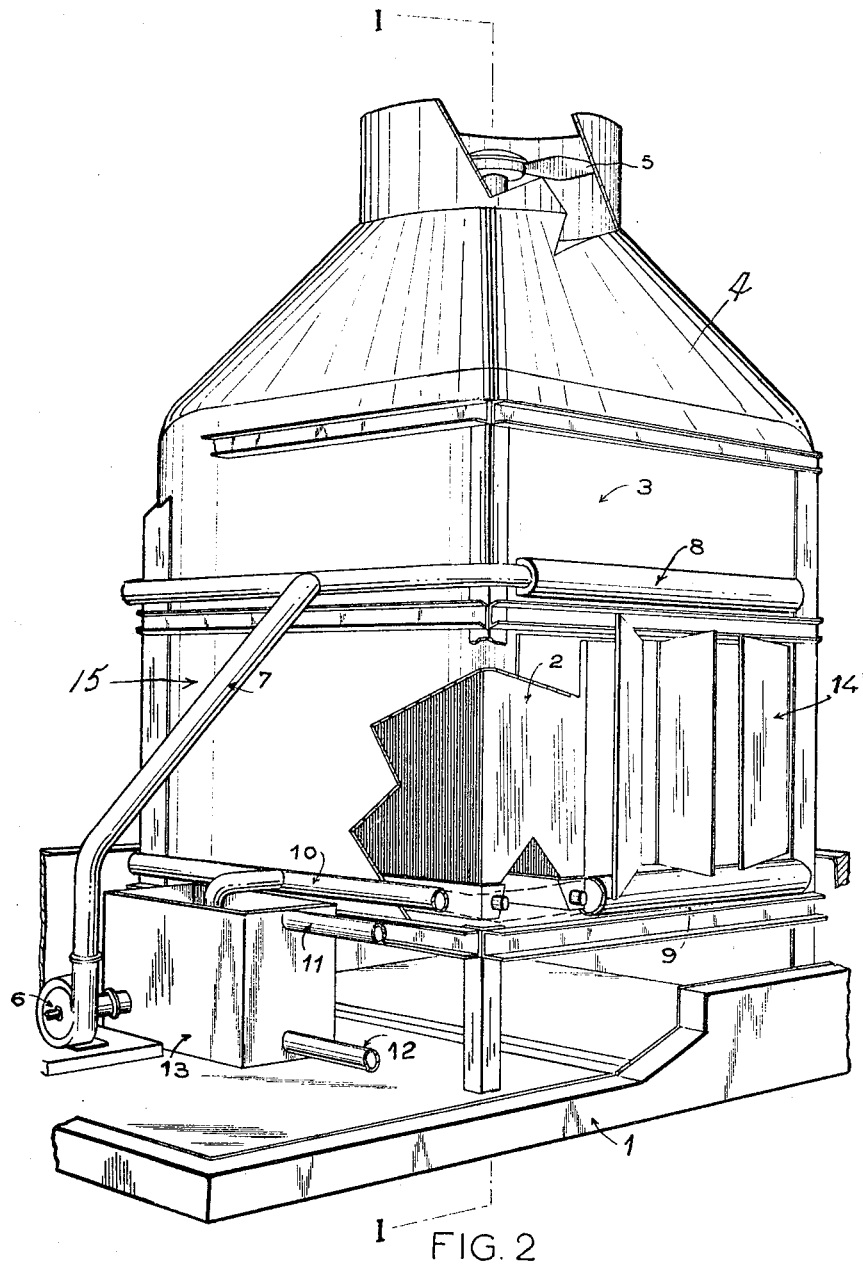

FIG. 2 represents a view taken in perspective and partially broken away of an apparatus for the concentration of dangerous liquids in accordance with the invention as applied to the concentration of radioactive effluents.

The apparatus has the shape of a square tower with a metallic framework and is surrounded by an open concrete tank or "tray" 1 which is intended to prevent any accidental escape of the dangerous liquid and to recover any liquid which may overflow from the bottom collectors 9. Said apparatus is constituted by a cell which is placed inside the dividing tank 15 and which comprises the following elements: a set of wetted-surface plates 2 disposed vertically in the bottom portion of the apparatus, a system of deflectors and baffles 3a (shown diagrammatically in FIG. 3) placed above the plates 2 and which are located at the base of the chamber 3, and a cone 4 designed to direct the airstream filaments towards a suction fan 5, corresponding to the suction fan $V_1$, which delivers to the exterior.

The liquid in concentrated solution is present in the interior of the tank 13. A pump 6 effects the circulation of the liquid to be concentrated and feeds distributors for the purpose of supplying liquid to the plates 2 by means of gutters 8, the liquid to be concentrated after streaming down over the plates 2 being recovered by means of collectors 9 which are located at the bottom portion of the plates 2 and which are connected to a collector-conduit 10 through which said liquid is discharged into the buffer tank 13. The pump 6 directs the liquid to be concentrated which is contained in the tank 13 to the gutters 8 at the top portion of the dividing tank 15 through the pipe 7. The fresh liquid to be concentrated enters the tank 13 through the pipe 11. The evacuation of the concentrate obtained is carried out at the bottom portion of the tank 13 through pipe 12.

The apparatus in accordance with the invention is fitted with shutters 14 which are mounted on the side at the head of the sets of plates 2 and the displacement of which permits the said plates 2 to be easily replaced.

Figure 3:
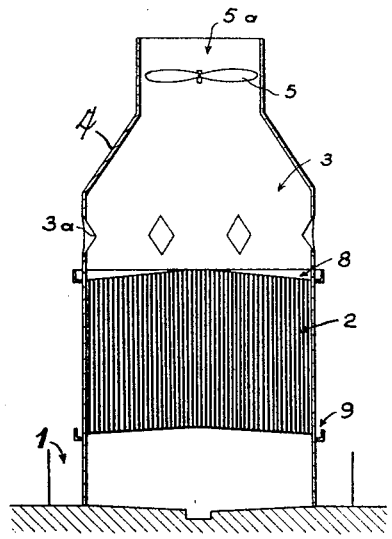

FIG. 3 (cross-section taken along the line I—I of FIG. 2) shows diagrammatically the internal arrangement of the apparatus: the base or tray-type tank 1 for recovery of liquids, the wetted-surface plates 2, the deflectors, or baffles 3a, the chamber 3, the cone frustum 4, the fan 5 and the evacuation chimney 5a, as well as the frontal feed gutters 8, and the collectors 9 for recovery of concentrated liquid.

The typical characteristics of the apparatus are as follows:

Cell comprising 819 plates 2, namely 9 parallel sets of 91 plates supporting an evaporation surface of 2,400 m.$^2$.
Diameter of the air-circulation fan 5: 2.80 m.
Air delivery: 25 m.$^3$/sec.
Static depression on evaporation: 25 cpz.

The abbreviation "cpz." signifies "centipieze," a pieze corresponding to 0.010197 kilogram per square centimeter.

All the points of the circuit which are liable to come into contact with the dangerous liquids were made of plastic material in order to prevent any danger of corrosion, in particular: the wetted-surface plates, inside lining of the tower walls, inside lining of the tray-type recovery tank and buffer tank 13, and all piping and valves.

A series of tests has been conducted on an apparatus having the following characteristics:

Net cross-sectional area of air passage inside the dividing chamber B: 0.754 m.$^2$.
Minimum cross-sectional area of the throttling cone T: 0.255 m.$^2$ (namely 3 times smaller than the net cross-sectional area of the chamber B).
Cross-sectional area of the expansion chamber C: 1.60 m.$^2$ (namely approximately twice the net cross-sectional area of the dividing chamber B and six times the cross-sectional area of the minimum cone section).

The limiting air-velocity in the dividing chamber C was pre-established at 2.75 m./sec., increased to 8.25 m./sec. in the throttling cone T and reduced to 1.37 m./sec. in the expansion chamber C.

Practical tests were carried out over a period of 30 days. These tests served to establish that the level of activity of the air discharged from the apparatus was appreciably lower than the permissible level according to the standards recommended by the International Commission on Radiological Protection. The evaporation output was 12 kgs./hour in respect of a liquid-distribution surface area of 50 m.$^2$. This evaporation depends on the local climatological conditions (hygrometric state of the air, temperature, pressure, etc). In the case of the tests considered, the output varied between 6 kgs./hour and 15 kgs./hour.

In the course of the same tests, the liquid to be concentrated was re-dispersed progressively as the concentration was effected. It is precisely for this purpose that provision has been made for the circuit $f_3$ which is branched on the dispersion circuit $f_1$ and which makes it possible, by virtue of a delivery which is from 6 to 10 times higher than that of said dispersion circuit, to produce in the liquid which is present in the vessel A a degree of agitation which is sufficient to prevent any formation of permanent deposits and to assist the entrainment of such deposits to the dispersion chamber.

In order to provide the possibility of changing the dispersion apparatus which is contained in the dividing chamber, provision can be made for an arrangement whereby said dispersion apparatus can be removed as a complete unit, either in one or a number of operations, in order to avoid any manual contact which would be dangerous on account of the nature of the liquids subjected to treatment, and it is for this purpose that provision has accordingly been made for the displaceable shutters 14 which are illustrated in FIG. 2.

It should be noted that if the product to be concentrated deposits salts as a result of crystallization or simply products in suspension, these deposits can be retreated so as to dissolve them in a closed circuit in the minimum quantity of liquid. Since this liquid can be corrosive, it is recommended that the dispersion apparatus should be entirely constructed of a suitable material. In the case of radioactive solutions, it is possible to redissolve the deposits by means of a solution of dilute nitric acid by making use, for example, of a material made of polyvinyl chloride.

What we claim is:

1. Apparatus for the concentration by natural evaporation of liquids, and particularly of liquids which are radioactive, including: a reservoir for receiving said liquids to be concentrated; a dividing chamber positioned above said reservoir; a plurality of vertically disposed dividing plates mounted within said dividing chamber, and arranged so that said liquids can flow thereover from the top to the bottom thereof; first conduit means, including a pump, for conveying said liquids from said reservoir to above said dividing plates; second conduit means arranged to convey liquids from the bottom of said dividing plates to said reservoir; an expansion chamber above said dividing chamber, and having a section substantially larger than that of said dividing chamber; a hollow, converging, open ended truncated cone positioned between and communicating said dividing chamber with said expansion chamber, said cone narrowing in a direction toward said expansion chamber, and said expansion chamber being provided with an exit orifice having a section at least as great as the minimum section of said cone; a first fan means mounted at said cone; and a second fan means mounted at said exit orifice, said first and second fan means being arranged to circulate air through said dividing chamber in an upward direction.

2. Apparatus as recited in claim 1, wherein the wall of said dividing chamber has displaceable shutters mounted thereon, and wherein said dividing plates are detachably mounted within said dividing chamber and are insertable and removable through said shutters.

3. Apparatus as recited in claim 1, including additionally a by-pass conduit connected between said pump and said reservoir, and arranged to be operable for agitating liquids in said reservoir.

4. A process for the concentration by natural evaporation of liquids, particularly liquids which are radioactive, comprising the steps of: dividing the said liquids and circulating the divided liquids downwardly with respect to an upwardly flowing current of air inside of a dividing chamber, whereby droplets of said liquids are entrained in said current of air; passing the current of air through a hollow, open ended, converging cone after it has circulated through said divided liquids, to cause compression and an increase in the velocity of said current of air to effect combining of entrained droplets of liquid into larger droplets; passing the current of air from said converging cone into an expansion chamber whose transverse cross-sectional flow area is larger than that of the dividing chamber, to cause expansion and a decrease in the velocity of said current of air to effect precipitation of said larger entrained droplets; and passing the current of air substantially freed of entrainments from said expansion chamber through an exhaust orifice having a planar area at least equal to the area of the smaller base of said converging cone.

References Cited by the Examiner

UNITED STATES PATENTS

| | | |
|---|---|---|
| 851,121 | 4/1907 | Criswell et al. |
| 1,020,632 | 3/1912 | Beuenot et al. _____ 159—48 |
| 2,259,033 | 10/1941 | Fisher _____ 55—257 X |
| 2,359,078 | 9/1944 | Baumann _____ 159—31 |
| 2,475,984 | 7/1949 | Owen. |
| 2,525,224 | 10/1950 | Kaiser _____ 159—4 |
| 2,545,672 | 3/1951 | Pearson _____ 55—241 X |
| 2,771,460 | 11/1956 | Kooistra et al. |
| 2,882,996 | 4/1959 | Lanier et al. _____ 55—257 X |

FOREIGN PATENTS

| | | |
|---|---|---|
| 603,783 | 8/1960 | Canada. |
| 488,488 | 10/1918 | France. |
| 100,508 | 12/1940 | Sweden. |

NORMAN YUDKOFF, *Primary Examiner.*

J. SOFER, *Assistant Examiner.*